(12) United States Patent
Barrett

(10) Patent No.: US 6,832,321 B1
(45) Date of Patent: Dec. 14, 2004

(54) PUBLIC NETWORK ACCESS SERVER HAVING A USER-CONFIGURABLE FIREWALL

(75) Inventor: Joseph G. Barrett, Herndon, VA (US)

(73) Assignee: America Online, Inc., Dulles, VA (US)

( * ) Notice: Subject to any disclaimer, the term of this patent is extended or adjusted under 35 U.S.C. 154(b) by 0 days.

(21) Appl. No.: 09/432,344

(22) Filed: Nov. 2, 1999

(51) Int. Cl.[7] .......................... G06F 11/30; G06F 12/14; H04L 9/00; H04L 9/32
(52) U.S. Cl. ...................... 713/201; 713/150; 713/151; 713/152; 713/153; 713/154; 713/700; 709/221; 709/229
(58) Field of Search .................. 713/150, 151, 713/152, 153, 154, 200, 201; 709/221, 229

(56) References Cited

U.S. PATENT DOCUMENTS

| | | | | |
|---|---|---|---|---|
| 5,251,205 A | * | 10/1993 | Callon et al. | 370/392 |
| 5,430,727 A | * | 7/1995 | Callon | 370/401 |
| 5,598,536 A | * | 1/1997 | Slaughter et al. | 709/219 |
| 5,835,726 A | * | 11/1998 | Shwed et al. | 709/229 |
| 5,987,606 A | * | 11/1999 | Cirasole et al. | 713/200 |
| 6,321,334 B1 | * | 11/2001 | Jerger et al. | 713/200 |

FOREIGN PATENT DOCUMENTS

| | | |
|---|---|---|
| EP | 0 854 621 A1 | 7/1998 |
| WO | WO 98/41913 | 9/1998 |

OTHER PUBLICATIONS

Ian Austen, *Higher-Speed Lines Leave Door Ajar for Hackers*, Jul. 8, 1999, The New York Times.

* cited by examiner

*Primary Examiner*—Justin T. Darrow
*Assistant Examiner*—Joseph M McArdle
(74) *Attorney, Agent, or Firm*—Fish & Richardson P.C.

(57) ABSTRACT

A user-configurable firewall and method in which a user-changeable security setting for a client computer is maintained by an access server through which a user accesses the public network. The user-changeable security setting can be used to specify which outside computers or network devices may access the client computer and what type of access to the client computer is allowed. If an attempt to access the client computer is made, the user-configurable security setting is checked to determine if the attempted access is allowed by the current security setting. If the attempted access is allowed by the current security setting, access is allowed to the client computer; otherwise, access is not allowed. If the user changes the user-configurable security setting, the changes to the user-configurable security setting are provided to the access server.

64 Claims, 9 Drawing Sheets

| | | |
|---|---|---|
| ID Field | JohnDoe | 202 |
| Security Level Field | Block_Unknown | 204 |
| Allowed List | 192.233.214.66<br>198.81.17.232<br>209.191.164.20<br>216.32.120.21<br>204.71.200.33<br>.<br>.<br>. | 206 |
| Blocked List | 131.107.1.7<br>131.107.1.240<br>209.130.187.10<br>208.145.170.6<br>216.2.8.3<br>.<br>.<br>. | 208 |

FIG. 8

PUBLIC NETWORK ACCESS SERVER HAVING A USER-CONFIGURABLE FIREWALL

TECHNICAL FIELD

This application relates to a public network access server having a user-configurable firewall.

BACKGROUND

The computer system 100 illustrated in FIG. 1 represents a typical hardware setup for executing software that allows a user to perform tasks such as communicating with other computer users, accessing various computer resources, and viewing, creating, or otherwise manipulating electronic content—that is, any combination of text, images, movies, music or other sounds, animations, 3D virtual worlds, and links to other objects. The system includes various input/output (I/O) devices (mouse 103, keyboard 105, display 107) and a general purpose computer 100 having a central processor unit (CPU) 121, an I/O unit 117 and a memory 109 that stores data and various programs such as an operating system 111, and one or more application programs 113. The computer system 100 also typically includes some sort of communications card or device 123 (e.g., a modem or network adapter) for exchanging data with a network 127 via a communications link 125 (e.g., a telephone line).

As shown in FIG. 2, a user of a computer system 129 can access a public network 131 (e.g., the Internet) via an access server 133 (such as an Internet service provider or "ISP"). Among other things, this enables computer system 129 to send and receive data from other computers (not shown in FIG. 2) that are connected to the public network 131 (referred to as "outside" computers). For example, one of the outside computers can act as a host of a web site from which the computer system 129 can view web pages using a "browser" program (e.g., an Internet browser such as Netscape Communicator version 4.7, which is commercially available from Netscape Communications Corporation of Mountain View, Calif.) running on the computer system 129.

By connecting to a public network 131 such as the Internet, however, the computer system 129 can become vulnerable to attacks from outsiders (sometimes referred to as "hackers" or "crackers") who use the public network 131 to attempt to gain unauthorized access to computers connected thereto. After gaining unauthorized access to a computer system 129, such outsiders often view, copy, alter, delete, and/or redistribute data and programs that reside on the computer system 129.

The threat to users who access the Internet using dial-up modem connections (referred to as "dial-up connections") over conventional plain old telephone service (POTS) lines typically has been relatively low. A user employing such a dial-up connection typically is assigned a temporary "IP address." An IP (Internet Protocol) address is a worldwide unique identifier that identifies a particular computer or other network device on the Internet. For example, as shown in FIG. 3, a user can access the Internet 141 via a modem 143 connected to a computer 145 by dialing into an access server 147 using a POTS line. The access server 147 includes a terminal server 149 having multiple "ports." Several dial-up modems (not shown in FIG. 3) are connected to the ports of the terminal server 149 in order to receive data transmitted by the user's modem 143. The terminal server 149 is connected to a dial-up host computer 151 (e.g., a computer workstation running a variant of the UNIX operating system). The dial-up host computer 151 is connected to the Internet 141, typically via a high-speed connection 153 (e.g., a T1 connection). The access server 147 and the high-speed connection 153 typically are maintained by an ISP.

A different temporary IP address is typically assigned to the user's computer 145 each time the user dials into the access server 147. The IP address that is assigned to the user's computer 145 is temporary since the user typically disconnects the computer 145 from the access server 147 when the user is not accessing the Internet. This allows the ISP to re-use the IP address previously assigned to the user's computer 145 as the temporary IP address of another computer that subsequently dials into the access server 147.

Because the IP address of the user's computer 145 may change each time the user dials into the access server 147, it is difficult for an outsider successfully to use hacking techniques that require knowledge of the IP address of the user's computer. For example, one cannot telnet into a user's computer 145 without knowing the computer's IP address.

Recently, high-speed alternatives to conventional dial-up Internet connections have become increasingly popular. These high-speed alternatives include digital subscriber lines ("DSL") and cable modem connections, which typically allow users to use their telephone lines for voice transmissions simultaneously with data connections. As a result, many users of these new high-speed connections do not disconnect their computers from the Internet when they are not actively accessing the Internet. Remaining persistently connected in this manner enables users to avoid the overhead (delay and effort) associated with reconnecting to the Internet that they otherwise would encounter each time they accessed the Internet. As a result, many Internet service providers are assigning fixed (i.e., non-temporary) IP addresses to computers that make use of such high-speed "always connected" Internet connections. However, because the use of permanent IP addresses facilitates certain hacking techniques, the security advantages associated with the use of temporary IP addresses are lost when fixed IP addresses are used.

One way in which enterprises such as businesses and educational institutions have protected their networks and computers (which typically are assigned fixed IP addresses) is to employ a "firewall." A firewall is a system for controlling access to the enterprise's network and/or computers (referred to as the "internal" network and computers) by other computers (referred to as "outside" computers) that attempt to access the internal networks and computers through a public network. The purpose of a firewall is to allow network elements to be attached to, and thereby access, a public network without rendering the network elements susceptible to unauthorized access from the public network. A successful firewall allows the network elements (e.g., routers, computers, servers, etc.) to communicate with the public network elements without rendering the network elements susceptible to attack or unauthorized inquiry over the public network. Such firewalls use known techniques such as "packet filtering" and "application gateways" for determining which data packets to forward to the inside networks and computers.

Firewalls that are employed to protect networks and computers used in business and educational settings typically implement a security policy that determines how each internal user of the firewall-protected network can access the public network. Typically, these security policies implement a "one-size-fits-all" approach in which all users of a certain type are assigned the same access rights to the public network. A one-size-fits-all approach often is desirable in such institutional settings since such an approach is generally simpler to implement, maintain, and audit and such institutions are generally in a position to impose such an approach on users of their networks and computers.

Most Internet service providers, however, traditionally have not employed firewalls to protect their users' computers from attacks originating from the Internet. Users who access the Internet via dial-up connections typically do not need such security measures due to the security advantages associated with the use of temporary IP addresses. Moreover, most ISPs do not wish to, and/or are not in a position to, impose on their users a one-size-fits-all security policy of the type conventionally associated with the use of firewalls. Instead, ISPs have typically left it up to their users to implement some type of firewall on their computers if they wish (referred to as "client-based firewalls").

Client-based firewalls typically require a certain amount of technical sophistication on the part of the user. For example, users requiring additional protection from attacks may be unaware either of the threat or the potential protection that can be provided by client-based firewalls. Even if the user is aware of the threat and the potential protection that can be provided by client-based firewalls, the user may be unable or unwilling to install a client-based firewall properly, e.g., because the user does not have the required technical expertise. Also, the user may fail to maintain the client-based firewall. For example, the user may fail to install updated software that addresses a newly discovered potential security weakness in the client-based firewall in a timely manner. Indeed, another shortcoming of client-based firewalls is that each user of a client-based firewall must separately update that user's firewall.

The present inventors recognized the need for a server-based firewall solution that does not impose a one-size-fits-all solution on the users of an access server.

SUMMARY

Implementations may include one or more of the following features. In one aspect, a method of controlling access to a client computer connected to a network (e.g., a public network) by a server (e.g., an access server) may include maintaining at the server a user-changeable security setting for the client computer. Also, the method may include selectively granting access to the client computer from the network if allowed by the user-changeable security setting.

Selectively granting access to the client computer may include receiving at the server a request to establish a connection (e.g., an inbound connection) between an outside computer and the client computer and, if allowed by the user-changeable security setting, establishing the connection between the outside computer and the client computer. Moreover, selectively granting access to the client computer may include receiving at the server an inbound packet from an outside computer and, if allowed by the user-changeable security setting, forwarding the inbound packet to the client computer. The inbound packet may be formatted according to a first protocol, which may be used by the network. Also, the inbound packet may be encapsulated according to another protocol (e.g., a protocol used by a value-added network connected to the server) before being forwarded to the client computer. The method also may include de-encapsulating the encapsulated inbound packet at the client computer.

The method further may include receiving a change to the user-changeable security setting from a user of the client computer, and providing the change to the server. The user-changeable security setting may prohibit inbound connections from being established or may allow inbound connections to be established (e.g., if an outbound connection was previously established by the client computer with the outside computer).

In another aspect, a system for controlling access to a client computer connected to a network may include a server (e.g., an access server) connected to the client computer and the network (e.g., a public network). The system also may include server software in a computer-readable medium comprising instructions for causing the server to maintain a user-changeable security setting and selectively grant access to the client computer from the network if allowed by the user-changeable security setting. In addition, the system may include client software in a computer-readable medium comprising instructions for causing the client computer to receive a change to the user-changeable security setting from a user of the client computer and provide the change to the server computer.

The server software may include instructions to receive at the server a request to establish a connection (e.g., an inbound connection) between an outside computer and the client computer and, if allowed by the user-changeable security setting, establish the connection between the outside computer and the client computer.

The server software also may include instructions to receive at the server an inbound packet from an outside computer and, if allowed by the user-changeable security setting, forward the inbound packet to the client computer. The inbound packet may be formatted according to a first protocol, which may be used by the network. The system may also encapsulate the inbound packet according to another protocol (e.g., a protocol used by a value-added network connected to the server) before forwarding the inbound packet to the client computer. The server software may also include instructions to de-encapsulate the encapsulated inbound packet.

In another aspect, a server for controlling access to a client computer connected to a network may include a first port for connecting the server to the client computer and another port for connecting the server to the network. The server also may include software in a computer-readable medium comprising instructions for causing the server to maintain a user-changeable security setting and selectively grant access to the client computer from the network if allowed by the user-changeable security setting.

In another aspect, client computer software in a computer-readable medium residing on a client computer that is connected by a server to a network may include instructions for causing the client computer to receive a change to a user-changeable security setting from a user of the client computer and provide the change to the server. The user-changeable security setting may be used by the server to selectively grant access to the client computer from the network if allowed by the user-changeable security setting. For example, the user-changeable security setting may be used by the server to establish a connection (e.g., an inbound connection) between an outside computer and the client computer if allowed by the user-changeable security setting. Also, the user-changeable security setting may be used by the server to forward an inbound packet to the client computer if allowed by the user-changeable security setting. The inbound packet is formatted according to a first protocol, which may be used by the network. Furthermore, the inbound packet may be encapsulated according to another protocol (e.g., a protocol used by a value-added network connected to the server) before being forwarded to the client computer. The software may also include instructions to de-encapsulate the encapsulated inbound packet.

One or more of the following advantages may be realized. A public network access server having a user-configurable firewall provides a server-based firewall solution that need not impose a one-size-fits-all solution on the users of the access server. The server-based firewall may be centrally managed by an ISP who presumably has the requisite expertise to properly manage such a server-based firewall. Also, the ISP may respond to new threats to, and/or vulnerabilities in, the server-based firewall by implementing a response at a centrally managed location of the sever-based firewall, as opposed to having each user of the access server separately implement such a response on each client computer. In addition by employing a default security setting, such an access server provides a degree of protection for those users who are unaware of the potential threats to their computers and/or the potential benefits of employing a firewall.

Further advantages and features will be apparent from the following description, including the drawings and the claims.

DRAWING DESCRIPTIONS

FIG. 8 is a schematic diagram of a data structure maintained by the access server of FIG. 5.

Like reference numbers and designations in the various drawings indicate like elements.

DETAILED DESCRIPTION

Figure 1:
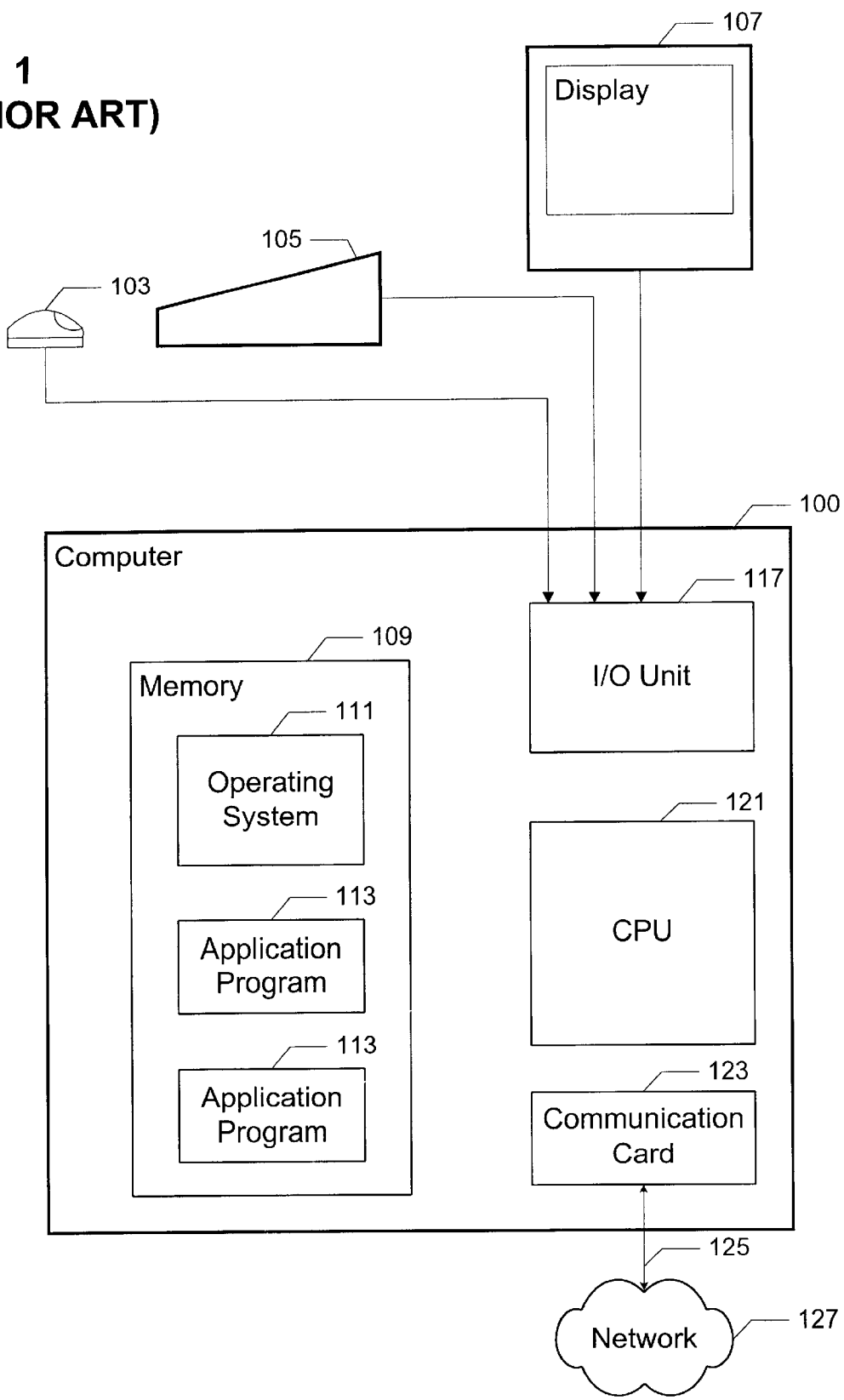
FIG. 1 is a block diagram of a computer system.
Figure 2:
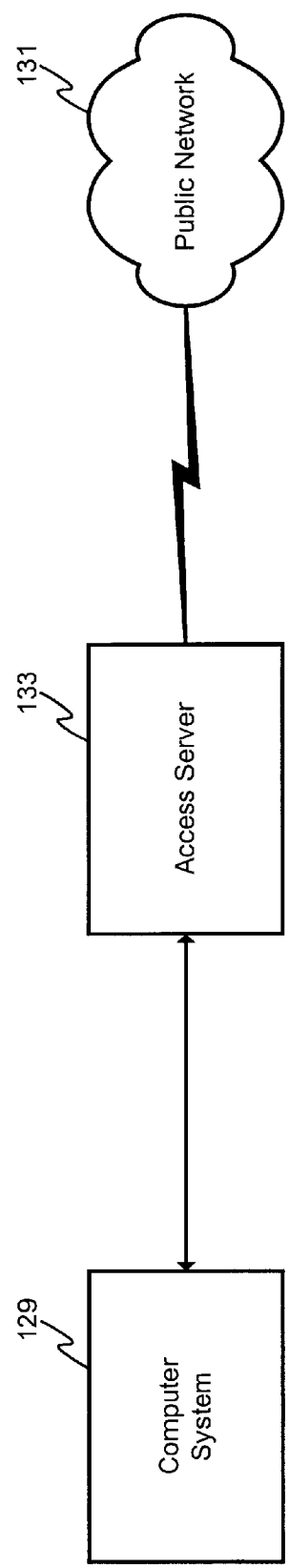
FIG. 2 shows a typical network computing environment.
Figure 3:
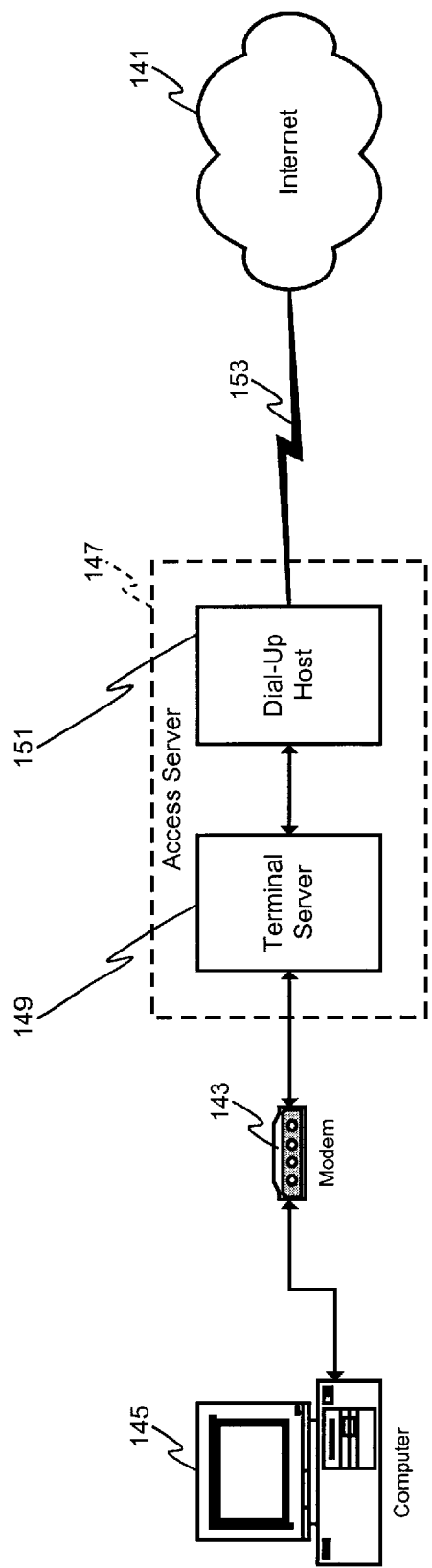
FIG. 3 shows a typical dial-up connection to the Internet.
Figure 4:
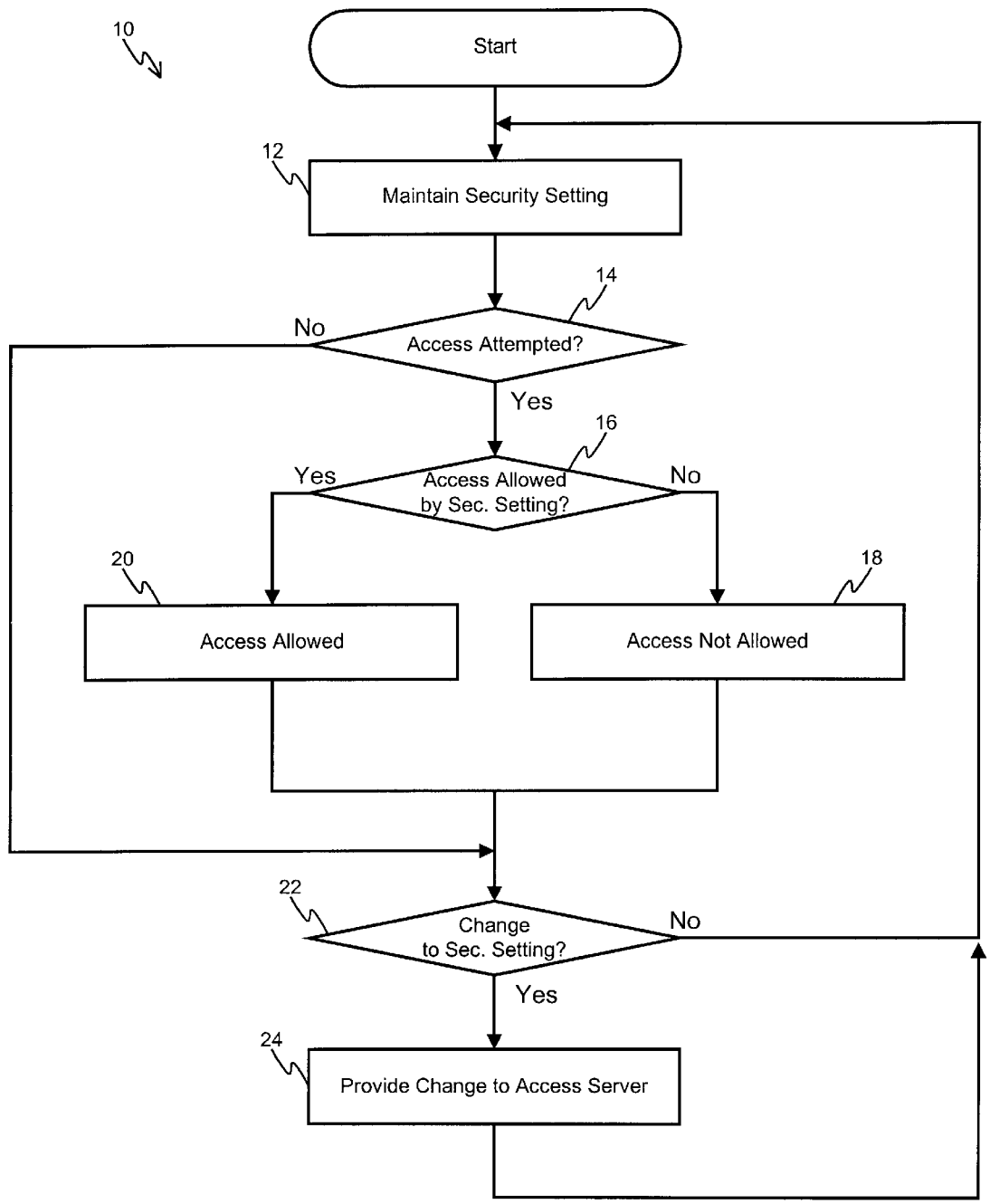
FIG. 4 is a flowchart of a process of providing access to a public network in which a user can configure a firewall.

A process 10 of controlling access to a public network in which a user can configure a firewall is shown in FIG. 4. In step 12, a user-changeable security setting is maintained by an access server through which the user accesses the public network. The user-changeable security setting can be used to specify which outside computers or network devices (i.e., those computers and network devices that are accessible to a user's computer only via the public network) may access the user's computer and what type of access to the user's computer is allowed. The term "access" as used herein includes, by way of example, attempts to establish connections (e.g., TCP connections) with the user's computer or attempts to send packets (e.g., IP packets) to the user's computer.

If an attempt to access the client computer is made (which is checked in step 14), the user-configurable security setting is checked in step 16 to determine if the attempted access is allowed by the current security setting. If the attempted access is not allowed by the current security setting, access is not allowed to the user's computer (as shown in step 18). If the attempted access is allowed by the current security setting, access is allowed to the user's computer (as shown in step 20).

If the user changes the user-configurable security setting (which is checked in step 22), the changes to the user-configurable security setting are provided to the access server in step 24. The process 10 then loops back to step 12, where the access server maintains the user-configurable security setting by updating it with the changes made by the user.

Figure 5:
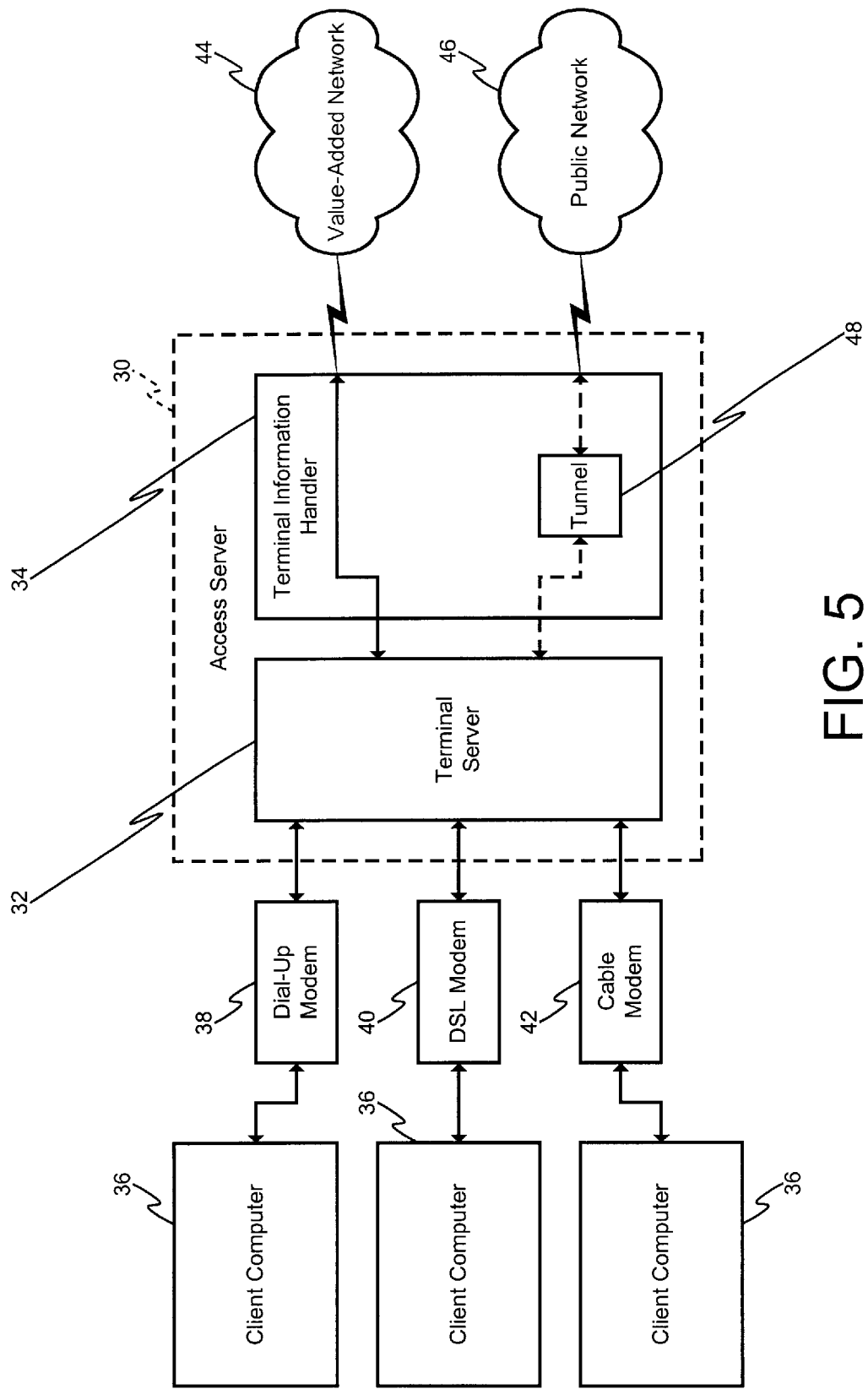
FIG. 5 is a block diagram of an access server connecting client computers to a value-added network and a public network.

An access server 30 that can implement the process 10 is shown in FIG. 5. The access server 30 can include a terminal server 32 and a terminal information handler 34. The terminal server 32 is configured to connect the access server 30 to a plurality of client computers 36. The terminal server 32 typically has a plurality of ports (not shown in FIG. 5) through which a client computer 36 can establish a connection with the access server 30. The terminal server 32 can be configured to establish the desired number and type of connections between the access server 30 and the client computers 36 using any type of communication link, including by way of example a dial-up connection established between a client dial-up modem 38 connected to a client computer 36 and a server modem (not shown) connected to the terminal server 32, a DSL connection established between a client DSL modem 40 connected to a client computer 36 and a server DSL modem (not shown) connected to the terminal server 32, and a cable modem connection established between a cable modem 42 connected to a client computer 36 and a receiver port card within a headend controller (not shown) connected to the terminal server 32. Although terminal server 32 is shown in FIG. 5 as a single entity, it is to be understood that the terminal server 32 can be implemented as a plurality of terminal servers that are logically, physically, and/or geographically separated from one another and/or from the terminal information handler 34. Moreover, in some implementations, the terminal server 32 may be owned and/or managed by an entity that is separate from the entity that owns and/or manages the terminal information handler 34.

The terminal information handler 34 is connected to the terminal server 32 so as to connect the client computers 36 to a value-added network 44 (e.g., America Online or other online service provider) and/or a public network 46 (e.g., the Internet). The connection between the terminal information handler 34 and the terminal server 32 preferably is a high-speed connection (e.g., a high-speed network connection) that is capable of handling the traffic from all of the client computers 36. Although there is only one connection between the terminal information handler 34 and the terminal server 32 shown in FIG. 5, it is to be understood that a plurality of connections between the terminal information handler 34 and the terminal server 32 can be used, e.g., to increase bandwidth and/or reliability. Moreover, although the terminal information handler 34 is shown in FIG. 5 as a single entity, it should be noted that the terminal information handler 34 can be implemented as a plurality of terminal information handlers that are logically, physically, and/or geographically separated from one another and/or from the terminal server 32.

The client computers 36 communicate with computers connected to the value-added network 44 and the public network 46 by sending and receiving packets of information. In one implementation, the value-added network 44 is configured to forward packets formatted according to a first protocol (such as a proprietary protocol used by the America Online value-added network), while the public network 46 is configured to forward packets formatted according to a second protocol (such as the TCP/IP protocol). The client computers 36 execute client software (such as the America Online version 4.0 or 5.0 client program) that is capable of creating and receiving packets formatted according to the proprietary protocol (referred to as "proprietary packets") so that the client computers 36 can exchange information via the value-added network 44. The client software also is capable of creating and receiving packets formatted according to the TCP/IP protocol (referred to as "IP packets") so that the client computers 36 can exchange information via the public network 46. When a client computer 36 creates an IP packet, the header portion of the IP packet (which includes source and destination address information) contains a local IP address that is assigned to the client computer 36. The local IP address can be either a temporary IP address or a permanent IP address.

In the implementation shown in FIG. 5, however, the access server 30 is configured to forward packets formatted according to the proprietary protocol. Therefore, before IP packets can be properly forwarded by the access server 30 on to the public network 46, the IP packets must be reformatted so as to comply with the proprietary protocol used by the access server 30. IP packets can be reformatted so as to comply with the proprietary protocol by using a process referred to as "tunnelling." Tunnelling involves first "encapsulating" the IP packets in a proprietary packet. An IP packet can be encapsulated by "stripping" away the header portion of the IP packet and placing the payload (i.e., data) portion of the IP packet in the payload portion of a proprietary packet (referred to as the "encapsulated packet"). Alternatively, the IP packet can be encapsulated by "wrapping" the entire unaltered IP packet in a proprietary packet. In other words, the entire IP packet can be placed in the payload portion of the proprietary packet. In both cases, the header portion of the proprietary packet is formatted using the header information from the original header portion of the IP packet. Encapsulation of the IP packet can be performed, e.g., by the client software running on the client computers 36 or by software running on the terminal server 32 (e.g., a tunnel 48 shown in FIG. 5). The encapsulated packet is then forwarded by the access server 30 according to the proprietary protocol.

When the terminal information handler 34 identifies a proprietary packet that is to be forwarded to the public network 46 (e.g., by inspecting the destination address field of the proprietary packet), the proprietary packet must be reformatted to comply with the IP protocol before it is ultimately forwarded to the public network 46. The proprietary packet is reformatted by the tunnel 48 that "deencapsulates" the encapsulated packet prior to forwarding the packet to the public network 46. The encapsulated packet is de-encapsulated by stripping away the header portion of the encapsulated packet and placing the payload portion of the encapsulated packet in the payload portion of an IP packet. The destination address from the proprietary packet is used as the destination address of the outgoing IP packet. The local IP address of the client computer 36 can be used as the source address of the outgoing IP packet, or a dynamically assigned IP address (referred to as a "dynamically assigned host address" or "DAHA" IP address) can be used, e.g., in order to avoid exposing to the public network the local IP address of the client computer 36 that created the original IP packet. If the encapsulated packet was encapsulated by wrapping the original IP packet in a proprietary packet, the payload portion of the encapsulated packet contains the original IP packet. The original IP packet can be forwarded to the public network 46 as originally created by the client computer 36 (i.e., with the local IP address of the client computer 36 in the source address of the IP packet), or the original IP packet can be modified by placing a DAHA IP address in the source address field of the IP packet in order to avoid exposing the local IP address of the client computer 36 that created the original IP packet to the public network 46.

Similarly, inbound IP packets that are forwarded to the access server 30 are encapsulated in a proprietary packet by the tunnel 48 to create a corresponding inbound proprietary packet, which is forwarded by the access server 30 to the appropriate client computer 36. The client software running on the client computer 36 de-encapsulates the encapsulated inbound proprietary packet in order to recover the original IP packet that was received from the public network 46.

Figure 6:
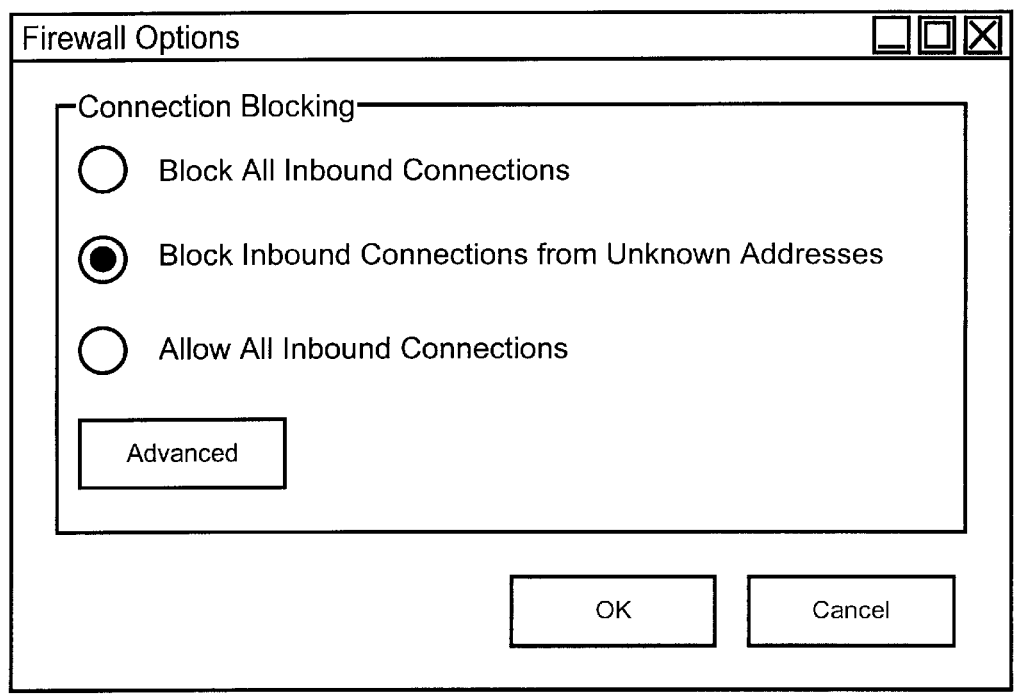
FIG. 6 is a schematic diagram of a window by which a user of a client computer can change security settings.

The access server 30 shown in FIG. 5 can be used to implement the process 10. For example, the access server 30 can maintain a user-configurable security setting for each client computer 36 (or each user of a client computer 36) that specifies those addresses from which inbound connections may be established. A user of a client computer 36 can set the user-configurable setting by using the client software running on the client computer 36. For example, as shown in FIG. 6, client software running on the user's client computer 36 can present a "Firewall Options" dialog box in which the user can specify one of three predefined security settings by clicking on radio buttons. As shown in FIG. 6, the predefined security settings include a setting in which all inbound connections are blocked, a setting in which inbound connections from unknown addresses are blocked, and a setting in which all inbound connections are allowed. Alternatively, the user can create a customized security setting by selecting an "Advanced" button. If the user elects to specify a customized security setting, the user can specify particular addresses from which connections should be blocked or allowed, specify certain types of connections to block or allow, and/or specify any other conditions under which connections are to be blocked or allowed. Also, the client software can be configured to allow the user to select whether the user wishes to have the local IP address of the client computer 36 be exposed to the public network 46 or whether the user wishes to have a DAHA IP address used instead. Preferably, a default security setting is automatically selected in the event that the user does not explicitly select a security setting.

Although the security setting options shown in FIG. 6 relate to the blocking and allowing of connections from specified addresses, it is to be understood that the client software could be modified so that the user can specify that packets (as opposed to connections) from specified addresses are to be blocked and/or allowed. Indeed, the user-configurable security setting can specify conditions for blocking and/or allowing any type of communication or access with outside computers and devices.

Figure 7:
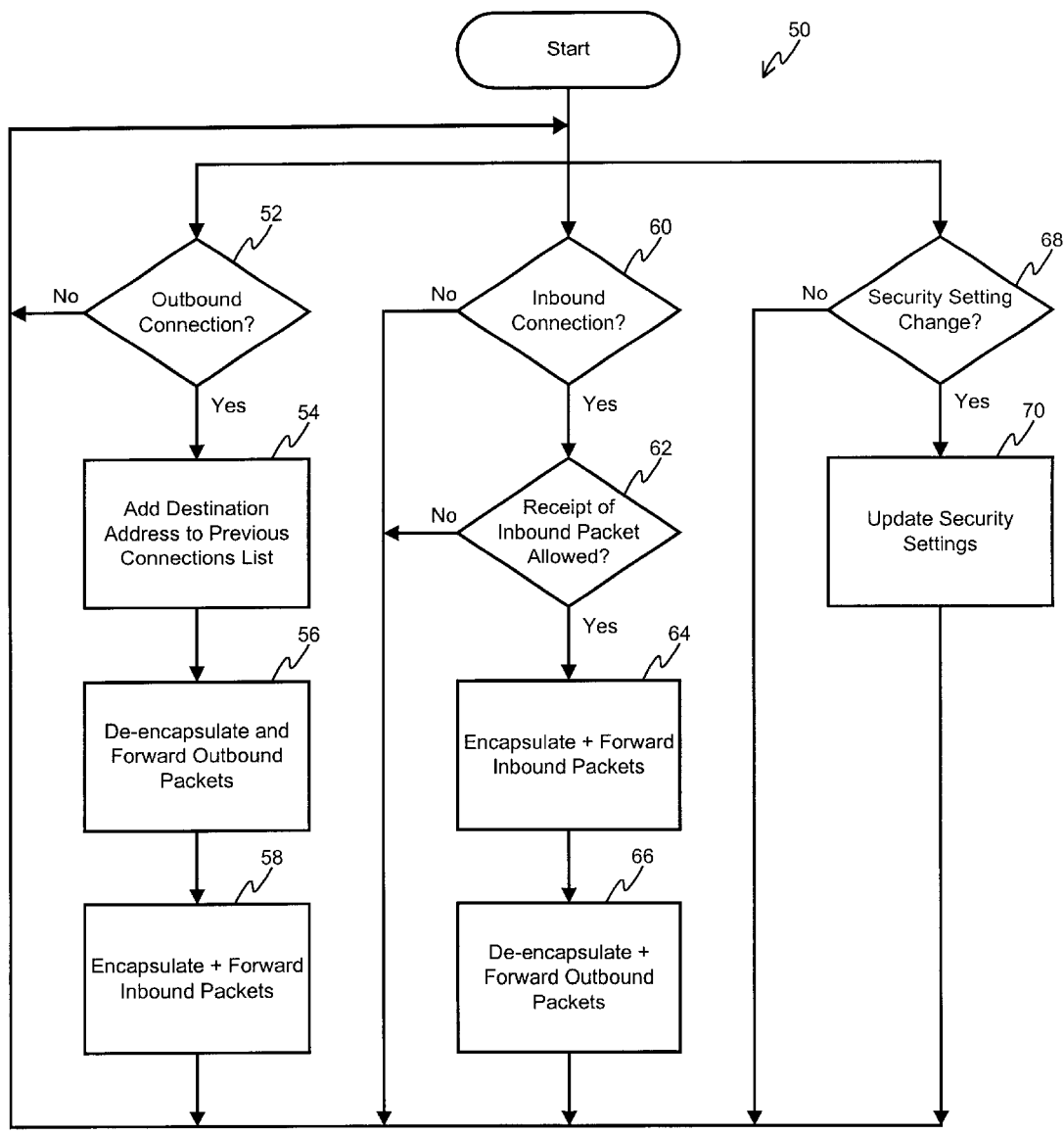
FIG. 7 is a flowchart of a process executed by the access server of FIG. 5.

A process 50, which can be executed by the access server 30 (for example, by the tunnel 48 of the terminal information handler 34) in order to implement the process 10, is shown in FIG. 7. In step 52, the process 50 checks if a request (i.e., a proprietary packet) has been received from the client computer 36 requesting that an outbound connection be established between the client computer 36 and an outside computer or other device using the public network 46. If such a request is received by the access server 30, the destination address of the outside computer is added to a list of destination addresses with which the client computer 36 has established outbound connections (referred to as the "previous connections list") in step 54. In step 56, outbound proprietary packets that are intended for the outside computer as a part of the outbound connection (which are encapsulated by the client software running on the client computer 36, as is explained below) are de-encapsulated to create corresponding IP packets to be forwarded to the public network 46. In step 58, inbound IP packets received by the access server 30 that are sent by the outside computer to the client computer 36 as a part of the outbound connection are encapsulated in order to create corresponding proprietary packets. The corresponding proprietary packets are forwarded to the client computer 36 by the access server 30. Although in this example the user-configurable security setting is not checked to determine if the user-configurable security setting allows each outbound connection to be established, it is to be understood that the process 50 could be modified to perform such a check before establishing each outbound connection.

In step 60, the process 50 checks if a request (i.e., an IP packet) has been received from the outside computer requesting that an inbound connection be established between the outside computer and the client computer 36. If such a request is received by the access server 30, the source address of the IP packet (which corresponds to the outside computer) is checked in step 62 to determine if the user-configurable security setting allows such an inbound connection to be established between the outside computer and the client computer 36.

For example, a data structure 200 (shown in FIG. 8) having an identification field 202, a security level field 204, a list 206 of allowed addresses (referred to as the "allowed list"), and/or a list 208 of blocked addresses (referred to as the "blocked list) can be maintained by the access server 30 (e.g., by the tunnel 48). The identification field 202 contains an indication of which computer and/or user the data structure 200 is associated with. The security level field 204 contains data indicating whether the allowed list 206 and/or the blocked list 208 should be consulted to determine if the user-configurable security setting allows an inbound connection to be established. The allowed list 206 contains the addresses (e.g., IP addresses) of outside computers or other network devices with which inbound connections to the client computer 36 (or user) are allowed to be established. For example, the previous connections list that is updated in step 54 can be incorporated into the allowed list 206. The blocked list 208 contains the addresses of outside computers or other network devices with which inbound connections to the client computer 36 are not allowed to be established. For example, the client software can be configured to allow users to specify that inbound connections with particular users are to be blocked.

If the security level field 204 indicates that the allowed list 206 should be consulted, the process 50 can determine whether the user-configurable security setting allows a requested inbound connection to be established by searching the allowed list 206 for the source address of the IP packet making the request. If the source address is not found in the allowed list 206, the requested inbound connection is not allowed to be established. If the security level field 204 indicates that the blocked list 208 should be consulted, the process 50 can determine whether the user-configurable security setting allows the requested inbound connection to be established by searching the blocked list 208 for the source address. If the source address is not found in the blocked list 208, then the requested inbound connection is allowed to be established. The security level field 204 can also contain data indicating that all inbound connections may be established or that no inbound connections may be established. Moreover, the security level field 204 can include other data indicating that some other condition is to be used for determining whether to allow and/or block requested inbound connections.

Referring again to FIG. 7, if the user-configurable security setting allows a requested inbound connection to be established, then in step 64 inbound IP packets sent by the outside computer to the client computer 36 as a part of the inbound connection are encapsulated in order to create corresponding proprietary packets that can be forwarded to the client computer 36. Also, if the user-configurable security setting allows such an inbound connection to be established, in step 66 outbound proprietary packets intended for the outside computer as a part of the inbound connection (which are encapsulated by the client software running on the client computer 36, as is explained below) are de-encapsulated to create corresponding IP packets that can be forwarded to the outside computer via the public network 34.

In step 68, the process 50 checks if a change to the user-configurable security setting has been received from the client computer 36. If such a change has been received, the access server 30 updates the user-configurable security setting maintained for that client computer (or user) by the access server 30 in step 70.

Figure 9:
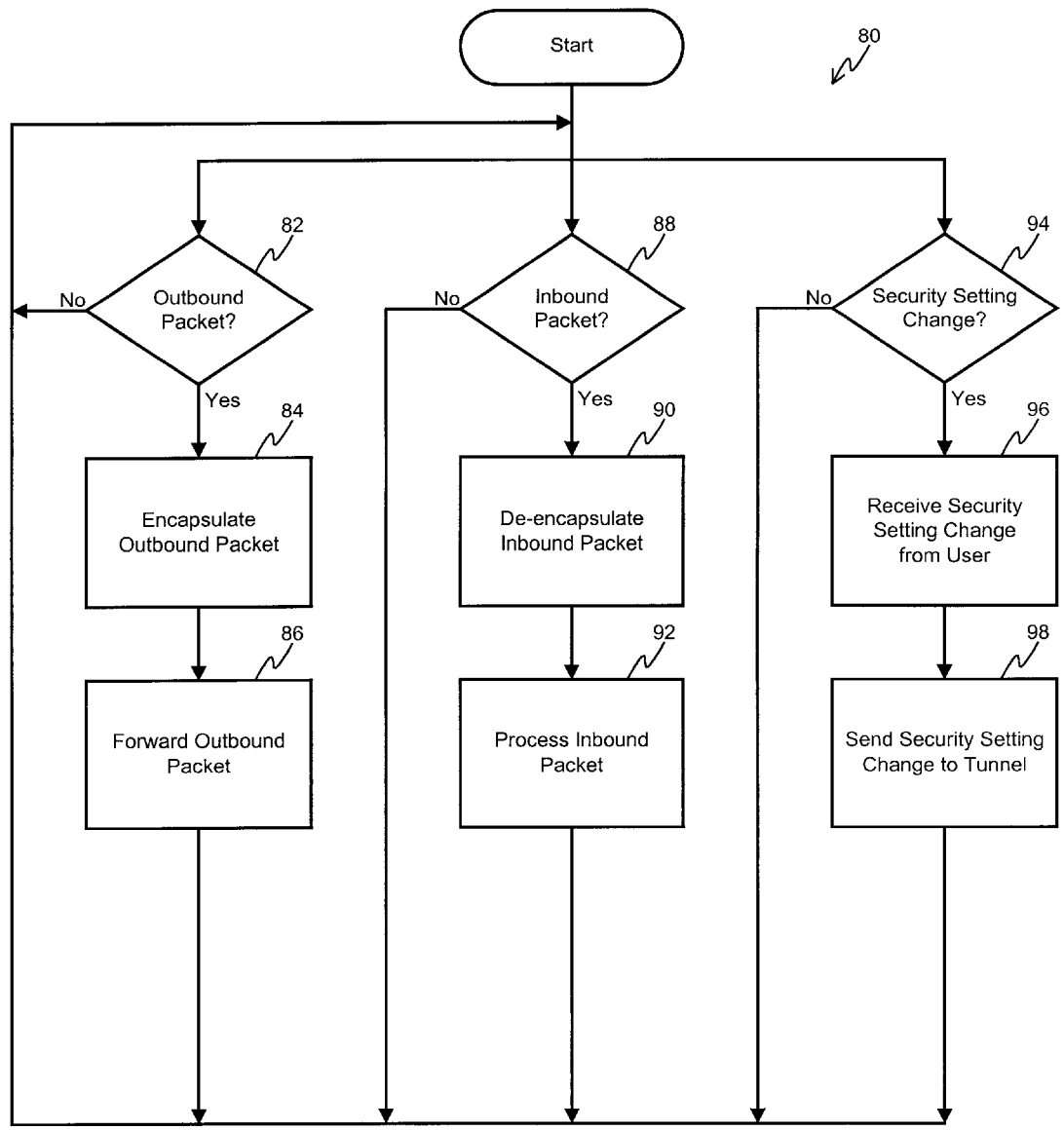
FIG. 9 is a flowchart of a process executed by the client computer of a FIG. 5.

A process 80, which can be executed by the client computer 36 (e.g., as a part of client software running on the client computer 36) in order to implement process 10, is shown in FIG. 9. In step 82, process 80 checks if an outbound IP packet is being sent by the client computer 36. If an outbound IP packet is being sent, in step 84 the outbound IP packet is encapsulated to create a corresponding proprietary packet, which is forwarded to the access server 30 in step 86.

In step 88, the process 80 checks if an inbound proprietary packet from the public network 46 (which is determined by checking the source address field of the inbound proprietary packet) has been forwarded to the client computer 36 via the access server 30. If such an inbound proprietary packet has been forwarded to the client computer 36, in step 90 the inbound proprietary packet is de-encapsulated to recover the original IP packet received by the access server 30, which is processed in a conventional manner in step 92 by the client software.

In step 94, the process 80 checks if the user has changed the user-configurable security setting. If the user has changed the user-configurable security setting, then the client software receives the change from the user (e.g., via a dialogue box of the type shown in FIG. 6) in step 96 and forwards the change to the access server 30 in step 98.

Various implementations of the systems and techniques described here may be realized in digital electronic circuitry, or in computer hardware, firmware, software, or in combinations thereof. A system or other apparatus that uses one or more of the techniques and methods described here may be implemented as a computer-readable storage medium, configured with a computer program, where the storage medium so configured causes a computer system to operate on input and/or generate output in a specific and predefined manner. Such a computer system may include one or more programmable processors that receive data and instructions from, and transmit data and instructions to, a data storage system, and suitable input and output devices.

Each computer program may be implemented in a high-level procedural or object-oriented programming language, or in assembly or machine language if desired; and in any case, the language may be compiled or interpreted language. Suitable processors include, by way of example, both general and special purpose microprocessors.

Generally, a processor will receive instructions and data from a read-only memory and/or a random access memory. Storage devices suitable for tangibly embodying computer program instructions and data include all forms of non-volatile memory, including semiconductor memory devices, such as EPROM, EEPROM, and flash memory devices; magnetic disks such as internal hard disks and removable disks; magneto-optical disks; and CD-ROM disks.

Any of the foregoing may be supplemented by, or implemented in, specially-designed ASICs (application-specific integrated circuits).

A number of embodiments of the present invention have been described. Nevertheless, it will be understood that various modifications may be made without departing from the spirit and scope of the invention. Accordingly, other embodiments are within the scope of the following

What is claimed is:

1. A method of controlling access to a client computer connected to a network by a server, the method comprising:
   maintaining at the server a user-changeable security setting for the client computer, wherein the user-changeable security setting is changeable by an individual user of the client computer; and
   selectively granting access to the client computer from the network if allowed by the user-changeable security setting, wherein the user-changeable security setting allows an inbound connection from an outside computer to be established with the client computer only if an outbound connection was previously established by the client computer with the outside computer.

2. The method of claim 1, wherein selectively granting access to the client computer includes:
   receiving at the server a request to establish a connection between the outside computer and the client computer; and
   if allowed by the user-changeable security setting, establishing the connection between the outside computer and the client computer.

3. The method of claim 2, wherein the connection is the inbound connection.

4. The method of claim 1, wherein selectively granting access to the client computer includes:
   receiving at the server an inbound packet from the outside computer; and
   if allowed by the user-changeable security setting, forwarding the inbound packet to the client computer.

5. The method of claim 4, wherein the inbound packet is formatted according to a first protocol.

6. The method of claim 5, wherein the first protocol is used by the network.

7. The method of claim 5, wherein the inbound packet is encapsulated according to another protocol before being forwarded to the client computer.

8. The method of claim 7, wherein the other protocol is used by a value-added network connected to the server.

9. The method of claim 7, further comprising de-encapsulating the encapsulated inbound packet at the client computer.

10. The method of claim 1 further comprising:
    receiving a change to the user-changeable security setting from the individual user of the client computer; and
    providing the change to the server.

11. The method of claim 1 wherein the user-changeable security setting prohibits establishing inbound connections.

12. The method of claim 1 wherein the user-changeable security setting allows inbound connections to be established.

13. The method of claim 1, wherein the network is a public network.

14. The method of claim 1, wherein the server is an access server.

15. A system for controlling access to a client computer connected to a network, the system comprising:
    a server connected to the client computer and the network;
    server software in a computer-readable medium comprising instructions for causing the server to perform the following operations:
        maintain a user-changeable security setting; and
        selectively grant access to the client computer from the network if allowed by the user-changeable security setting, wherein the user-changeable security setting allows an inbound connection from an outside computer to be established with the client computer only if an outbound connection was previously established by the client computer with the outside computer; and
    client software in a computer-readable medium comprising instructions for causing the client computer to perform the following operations:
        receive a change to the user-changeable security setting from a user of the client computer; and
        provide the change to the server computer.

16. The system of claim 15, wherein the server software further comprises instructions to:
    receive at the server a request to establish a connection between the outside computer and the client computer; and
    if allowed by the user-changeable security setting, establish the connection between the outside computer and the client computer.

17. The system of claim 16, wherein the connection is the inbound connection.

18. The system of claim 15, wherein the server software further comprises instructions to:
    receive at the server an inbound packet from the outside computer; and
    if allowed by the user-changeable security setting, forward the inbound packet to the client computer.

19. The system of claim 18, wherein the inbound packet is formatted according to a first protocol.

20. The system of claim 19, wherein the first protocol is used by the network.

21. The system of claim 19, wherein the inbound packet is encapsulated according to another protocol before being forwarded to the client computer.

22. The system of claim 21, wherein the other protocol is used by a value-added network connected to the server.

23. The system of claim 21, wherein the server software further comprises instructions to de-encapsulate the encapsulated inbound packet.

24. The system of claim 15, wherein the network is a public network.

25. The system of claim 15, wherein the server is an access server.

26. A server for controlling access to a client computer connected to a network, the server comprising:
    a first port for connecting the server to the client computer;

another port for connecting the server to the network; and
software in a computer-readable medium comprising instructions for causing the server to perform the following operations:
  maintain a user-changeable security setting that is changeable by a user of the client computer; and
  selectively grant access to the client computer from the network if allowed by the user-changeable security setting, wherein the user-changeable security setting allows an inbound connection from an outside computer to be established with the client computer only if an outbound connection was previously established by the client computer with the outside computer.

27. The server of claim 26, wherein the software further comprises instructions to:
  receive at the server a request to establish a connection between the outside computer and the client computer; and
  if allowed by the user-changeable security setting, establish the connection between the outside computer and the client computer.

28. The server of claim 27, wherein the connection is the inbound connection.

29. The server of claim 26, wherein the software further comprises instructions to:
  receive at the server an inbound packet from the outside computer; and
  if allowed by the user-changeable security setting, forward the inbound packet to the client computer.

30. The server of claim 29, wherein the inbound packet is formatted according to a first protocol.

31. The server of claim 30, wherein the first protocol is used by the network.

32. The server of claim 30, wherein the inbound packet is encapsulated according to another protocol before being forwarded to the client computer.

33. The server of claim 32, wherein the other protocol is used by a value-added network connected to the server.

34. The server of claim 26, wherein the network is a public network.

35. The server of claim 26, wherein the server is an access server.

36. Client computer software in a computer-readable medium residing on a client computer that is connected by a server to a network, the software comprising instructions for causing the client computer to perform the following operations:
  receive a change to a user-changeable security setting from a user of the client computer, wherein the user-changeable security setting is used by the server to selectively grant access to the client computer from the network if allowed by the user-changeable security setting, wherein the user-changeable security setting allows an inbound connection from an outside computer to be established with the client computer only if an outbound connection was previously established by the client computer with the outside computer; and
  provide the change to the server.

37. The software of claim 36, wherein the user-changeable security setting is used by the server to establish the connection between the outside computer and the client computer if allowed by the user-changeable security setting.

38. The software of claim 37, wherein the connection is an inbound connection.

39. The software of claim 36, wherein the user-changeable security setting is used by the server to forward an inbound packet to the client computer if allowed by the user-changeable security setting.

40. The software of claim 39, wherein the inbound packet is formatted according to a first protocol.

41. The software of claim 40, wherein the first protocol is used by the network.

42. The software of claim 40, wherein the inbound packet is encapsulated according to another protocol before being forwarded to the client computer.

43. The software of claim 42, wherein the other protocol is used by a value-added network connected to the server.

44. The software of claim 42, further comprising instructions to de-encapsulate the encapsulated inbound packet.

45. A method of controlling access to a client computer connected to a network by a server, the method comprising:
  maintaining at the server a user-changeable security setting for the client computer; and
  selectively granting access to the client computer from the network if allowed by the user-changeable security setting, wherein the user-changeable security setting allows an inbound connection from an outside computer to be established with the client computer only if an outbound connection was previously established by the client computer with the outside computer and selectively granting access to the client computer includes:
    receiving at the server an inbound packet from the outside computer, and
    if allowed by the user-changeable security setting, forwarding the inbound packet to the client computer, wherein the inbound packet is formatted according to a first protocol and is encapsulated according to another protocol before being forwarded to the client computer and the other protocol is used by a value-added network connected to the server.

46. A method of controlling access to a client computer connected to a network by a server, the method comprising:
  maintaining at the server a user-changeable security setting for the client computer;
  selectively granting access to the client computer from the network if allowed by the user-changeable security setting, wherein the user-changeable security setting allows an inbound connection from an outside computer to be established with the client computer only if an outbound connection was previously established by the client computer with the outside computer and selectively granting access to the client computer includes:
    receiving at the server an inbound packet from the outside computer; and
    if allowed by the user-changeable security setting, forwarding the inbound packet to the client computer, wherein the inbound packet is formatted according to a first protocol and is encapsulated according to another protocol before being forwarded to the client computer; and
  de-encapsulating the encapsulated inbound packet at the client computer.

47. A method of controlling access to a client computer connected to a network by a server, the method comprising:
  maintaining at the server a user-changeable security setting for the client computer; and
  selectively granting access to the client computer from the network if allowed by the user-changeable security setting, wherein selectively granting access to the client computer includes:

receiving at the server a request to establish a connection between an outside computer and the client computer; and if allowed by the user-changeable security setting, establishing the connection between the outside computer and the client computer, wherein the connection is an inbound connection and the user-changeable security setting allows the inbound connection to be established with the client computer only if an outbound connection was previously established by the client computer with the outside computer.

48. A system for controlling access to a client computer connected to a network, the system comprising:

a server connected to the client computer and the network;

server software in a computer-readable medium comprising instructions for causing the server to perform the following operations:
   maintain a user-changeable security setting;
   selectively grant access to the client computer from the network if allowed by the user-changeable security setting, wherein the user-changeable security setting allows an inbound connection from an outside computer to be established with the client computer only if an outbound connection was previously established by the client computer with the outside computer;
   receive at the server an inbound packet from the outside computer; and
   if allowed by the user-changeable security setting, forward the inbound packet to the client computer; and client software in a computer-readable medium comprising instructions for causing the client computer to perform the following operations:
   receive a change to the user-changeable security setting from a user of the client computer; and
   provide the change to the server computer, wherein the inbound packet is formatted according to a first protocol and is encapsulated according to another protocol before being forwarded to the client computer and the other protocol is used by a value-added network connected to the server.

49. A system for controlling access to a client computer connected to a network, the system comprising:

a server connected to the client computer and the network;

server software in a computer-readable medium comprising instructions for causing the server to perform the following operations:
   maintain a user-changeable security setting;
   selectively grant access to the client computer from the network if allowed by the user-changeable security setting, wherein the user-changeable security setting allows an inbound connection from an outside computer to be established with the client computer only if an outbound connection was previously established by the client computer with the outside computer;
   receive at the server an inbound packet from the outside computer; and
   if allowed by the user-changeable security setting, forward the inbound packet to the client computer; and client software in a computer-readable medium comprising instructions for causing the client computer to perform the following operations:
   receive a change to the user-changeable security setting from a user of the client computer; and
   provide the change to the server computer, wherein the inbound packet is formatted according to a first protocol and is encapsulated according to another protocol before being forwarded to the client computer, and wherein the server software further comprises instructions to de-encapsulate the encapsulated inbound packet.

50. A server for controlling access to a client computer connected to a network, the server comprising:

a first port for connecting the server to the client computer;

another port for connecting the server to the network; and software in a computer-readable medium comprising instructions for causing the server to perform the following operations:
   maintain a user-changeable security setting;
   selectively grant access to the client computer from the network if allowed by the user-changeable security setting, wherein the user-changeable security setting allows an inbound connection from an outside computer to be established with the client computer only if an outbound connection was previously established by the client computer with the outside computer;
   receive at the server an inbound packet from the outside computer; and
   if allowed by the user-changeable security setting, forward the inbound packet to the client computer, and wherein the inbound packet is formatted according to a first protocol and is encapsulated according to another protocol before being forwarded to the client computer and the other protocol is used by a value-added network connected to the server.

51. Client computer software in a computer-readable medium residing on a client computer that is connected by a server to a network, the software comprising instructions for causing the client computer to perform the following operations:

receive a change to a user-changeable security setting from a user of the client computer, wherein the user-changeable security setting is used by the server to selectively grant access to the client computer from the network if allowed by the user-changeable security setting, wherein the user-changeable security setting allows an inbound connection from an outside computer to be established with the client computer only if an outbound connection was previously established by the client computer with the outside computer; and provide the change to the server, and wherein the user-changeable security setting is used by the server to forward an inbound packet to the client computer if allowed by the user-changeable security setting, the inbound packet is formatted according to a first protocol and is encapsulated according to another protocol before being forwarded to the client computer, and the other protocol is used by a value-added network connected to the server.

52. A method of controlling access to a client computer connected to a network by a server, the method comprising:

maintaining at the server a user-changeable security setting, wherein the user-changeable security setting is changeable by an individual user of the client computer; and selectively denying access to the client computer from the network, wherein the user-changeable security setting denies an inbound connection from an outside computer to be established with the client computer absent a previous outbound connection established by the client computer with the outside computer.

53. The method of claim 52, wherein the user-changeable security setting denies the inbound connection from the outside computer to be established with the client computer absent a previous outbound connection initiated by the client computer with the outside computer.

54. The method of claim 1, wherein the user-changeable security setting allows the inbound connection from the outside computer to be established with the client computer only if the outbound connection was previously initiated by the client computer with the outside computer.

55. The system of claim 15, wherein the user-changeable security setting allows the inbound connection from the outside computer to be established with the client computer only if the outbound connection was previously initiated by the client computer with the outside computer.

56. The server of claim 26, wherein the user-changeable security setting allows the inbound connection from the outside computer to be established with the client computer only if the outbound connection was previously initiated by the client computer with the outside computer.

57. The software of claim 36, wherein the user-changeable security setting allows the inbound connection from the outside computer to be established with the client computer only if the outbound connection was previously initiated by the client computer with the outside computer.

58. The method of claim 45, wherein the user-changeable security setting allows the inbound connection from the outside computer to be established with the client computer only if the outbound connection was previously initiated by the client computer with the outside computer.

59. The method of claim 44, wherein the user-changeable security setting allows the inbound connection from the outside computer to be established with the client computer only if the outbound connection was previously initiated by the client computer with the outside computer.

60. The method of claim 47, wherein the user-changeable security setting allows the inbound connection from the outside computer to be established with the client computer only if the outbound connection was previously initiated by the client computer with the outside computer.

61. The system of claim 48, wherein the user-changeable security setting allows the inbound connection from the outside computer to be established with the client computer only if the outbound connection was previously initiated by the client computer with the outside computer.

62. The system of claim 49, wherein the user-changeable security setting allows the inbound connection from the outside computer to be established with the client computer only if the outbound connection was previously initiated by the client computer with the outside computer.

63. The server of claim 50, wherein the user-changeable security setting allows the inbound connection from the outside computer to be established with the client computer only if the outbound connection was previously initiated by the client computer with the outside computer.

64. The software of claim 51, wherein the user-changeable security setting allows the inbound connection from the outside computer to be established with the client computer only if the outbound connection was previously initiated by the client computer with the outside computer.

\* \* \* \* \*